3,328,156
METHOD OF CONTROLLING PLANT GROWTH
Thomas R. Hopkins, Overland Park, Kans., assignor to Spencer Chemical Company, Kansas City, Mo., a corporation of Missouri
No Drawing. Original application Mar. 28, 1963, Ser. No. 268,581. Divided and this application Nov. 19, 1965, Ser. No. 515,800
6 Claims. (Cl. 71—2.6)

This application is a division of application Ser. No. 268,581, filed Mar. 28, 1963.

This invention relates to novel chemical compounds, herbicidal compositions containing said novel chemical compounds as an active ingredient and to methods for controlling plant growth with such herbicidal compositions.

There are provided by this invention novel chemical compounds conforming to the formula:

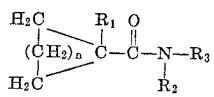

wherein $n$ has a value of 0–1; $R_1$ is selected from the group consisting of alkyl groups, aryl groups, and halogen atoms; and $R_2$ and $R_3$ are independently selected from the group consisting of hydrogen, alkyl groups, cycloalkyl groups, alkenyl groups, alkynyl groups, aralkyl groups, heterocyclic groups, and, when taken together with the nitrogen atom to which $R_2$ and $R_3$ are attached, a heterocyclic radical. For convenience in description, the above compounds subsequently will be referred to simply as cycloalkane carboxamides. As will be seen, the compounds of this invention are either unsubstituted amides or amides having one or more organic substituents on the nitrogen atom.

The cycloalkane carboxamides above described can be formulated with inert carriers, emulsifiers and the like to provide herbicidal compositions that can be used effectively to control plant growth. The resulting herbicidal compositions can be used as either pre-emergent or post-emergent herbicides.

The following examples are set forth to illustrate more clearly the principle and practice of this invention to those skilled in the art.

EXAMPLES I–VI

Four amides of 1-methylcyclopropane carboxylic acid are prepared by reacting methyl 1-methylcyclopropane-1-carboxylate with, respectively, 3-chloroaniline, 3-chloro-4-methylaniline, 2-methyl-5-chloroaniline, and 3,4-dichloroaniline.

In each synthesis 0.1 gram mol of methyl 1-methylcyclopropane-1-carboxylate, 0.1 gram mol of the amine, 0.11 gram mol of sodium methoxide and 200 ml. of benzene are stirred and heated to gentle reflux. Reflux is continued for about 12 hours while the benezene-methanol azeotrope is removed as formed. The reaction mixture is cooled to room temperature and there is then added thereto 50 ml. of water and 15 ml. of concentrated hydrochloric acid dissolved in 40 ml. of water. After thorough mixing, the organic phase is recovered by decantation and is successively extracted with diulte hydrochloric acid and water. The organic phase is dried and decolorized with carbon. After removal of the benzene under reduced pressure, the resulting amides are recrystallized from ligroin. The identification of the amides prepared (Examples I, II, III, and VI) and their melting points are set forth in Table I.

Three amides of 1-methylcyclopropane carboxylic acid are preferably prepared by an alternative procedure, in which 1-methylcyclopropane carbonyl chloride is reacted with 2,6-dichloroaniline, 2-6-dimethylaniline, and 2,5-dimethylaniline, respectively. The acid chloride is prepared conveniently by reacting a solution of 7.8 grams (0.078 mol) of 1-methylcyclopropane carboxylic acid with 20 ml. of thionyl chloride by standing for about 16 hours, followed by removal of excess thionyl chloride by distillation under reduced pressure. The residue, which consists essentially of 1 - methylcyclopropane carbonyl chloride (boiling point 132–134° C. at 760 mm. Hg), is then reacted with the substituted aniline compound without further purification by the procedure set forth in Section D under Example VII below, or by other procedures which are known to workers skilled in the art. The identification of the amides prepared (Examples IV, V, and V$a$) and their melting points are set forth in Table I.

TABLE I

| Example | Amide | M.P. ° C. of Amide |
|---|---|---|
| I | N-(3-chlorophenyl)-1-methylcyclopropane-1-carboxamide. | 118–120 |
| II | N-(3-chloro-4-methylphenyl)-1-methylcyclopropane-1-carboxamide. | 103–105 |
| III | N-(2-methyl-5-chlorophenyl)-1-methylcyclopropane-1-carboxamide. | 79–81 |
| IV | N-(2,6-dichlorophenyl)-1-methylcyclopropane-1-carboxamide. | 147–149 |
| V | N-(2,6-dimethylphenyl)-1-methylcyclopropane-1-carboxamide. | 128–130 |
| V$a$ | N-(2,5-dimethylphenyl)-1-methylcyclopropane-1-carboxamide. | 84–85 |
| VI | N-(3,4-dichlorophenyl)-1-methylcyclopropane-1-carboxamide. | 89–91 |

EXAMPLE VII

*Part A*

A solution of 20.1 grams (0.3 mol) of cyclopropane-1-carbonitrile, 45.2 grams (0.33 mol) of freshly distilled butyl bromide and 500 ml. of benzene is heated to 76° C. A slurry of sodium amide in benzene (freshly prepared from 6.9 grams (0.3 gram atom) of sodium in 150 ml. of benzene) is added slowly to maintain reflux and external heating is discontinued. After the addition of the sodium amide is completed, external heat is again applied and the mixture is refluxed for 24 hours. Thereafter, an additional 12 grams of butyl bromide is added to the reaction mixture and reflux is continued for an additional 24 hours. The reaction mixture is then cooled, extracted successively with water, dilute phosphoric acid and another portion of water, and finally dried. The benzene is removed by distillation at reduced pressure and the product is vacuum distilled to give 9.5 grams of liquid which boils at 68–70° C. at 7 mm. Hg and has a refractive index of 1.4326 at 19° C. The product is 1-butylcyclopropane-1-carbonitrile.

*Part B*

A mixture of 13 grams (0.106 mol) of 1-butylcyclopropane-1-carbonitrile and 34 grams (0.26 mol) of 75% sulfuric acid is stirred and heated at 130–135° C. for 1 hour. The solution is then cooled and maintained below 60° C. while 14.6 grams (0.212 mol) of sodium nitrite is added in small portions to facilitate hydrolysis of the nitrile group. After the addition of the sodium nitrite has been completed, the reaction mixture is stirred at room temperature for 1 hour and then poured onto ice. The organic phase is taken up in a small quantity of ether and dried. The material, after removing the ether, is distilled to give 1-butylcyclopropane-1-carboxylic acid which has a boiling point of 89–94° C. at 1 mm. Hg and a refractive index of 1.4496 at 19° C.

Part C

A solution of 11 grams (0.078 mol) of 1-butylcyclopropane-1-carboxylic acid and 20 ml. of thionyl chloride is permitted to stand for 16 hours at 25° C. and then refluxed for 2 hours. The excess thionyl chloride is removed under reduced pressure and the residue is vacuum distilled to give 9.7 grams of 1-butylcyclopropane-1-carbonyl chloride which has a boiling point of 67–69° C. at 10 mm. Hg.

Part D

The acid chloride prepared in Part C is added slowly to a stirred solution containing 9.8 grams (0.064 mol) of 3,4-dichloroaniline, 5.06 grams (0.064 mol) of pyridine and 100 ml. of benzene. Thereafter, 100 ml. of ethyl acetate is added and the reaction mixture is refluxed for 2 hours. The reaction mixture is cooled, and successively extracted with water, dilute hydrochloric acid, water, dilute sodium bicarbonate solution and water. The organic solution is then dried and decolorized with carbon. The solvents are removed under reduced pressure and the residue is then recrystallized from heptane to give 15.1 grams of product which melts at 118.5–120° C. The product is N-(3,4-dichlorophenyl)-1-butylcyclopropanecarboxamide.

EXAMPLES VIII–XIII

A series of amides are prepared by reacting 1-chlorocyclopropane-1-carbonyl chloride (prepared by the method of Bruylanta [Acad. Royale de Belgique Bulletin (1921), 705] with respectively, p-phenylazoaniline, p-acetylaniline, 3,4-dichloroaniline, 3-chloroaniline and 3-chloro-4-methylaniline by the procedure described in Example VII, Part D. The amides prepared and their melting points are set forth in Table II.

TABLE II

| Example | Amide | M.P. °C. of Amide |
|---|---|---|
| VIII | N-p-(phenylazo)phenyl-1-chlorocyclopropanecarboxamide | 196–198 |
| IX | N-(p-acetylphenyl)-1-chlorocyclopropanecarboxamide | 183–185 |
| X | N-phenyl-1-chlorocyclopropanecarboxamide | 62–63 |
| XI | N-(3,4-chlorophenyl)-1-chlorocyclopropanecarboxamide | 95–96 |
| XII | N-(3-chlorophenyl)-1-chlorocyclopropanecarboxamide | 73–74 |
| XIII | N-(3-chloro-4-methylphenyl)-1-chlorocyclopropanecarboxamide | 89–90 |

EXAMPLE XIV 1-bromocyclobutane-1-carbonyl chloride is prepared by the procedure of Campbell and Rydon [J. Chem. Soc., 3002 (1953)]. The acid chloride thus prepared is reacted with 3,4-dichloroaniline by the method described in Example VII, Part D to give N-(3,4-dichlorophenyl)-1-bromocyclobutanecarboxamide which melts at 96–97° C.

EXAMPLE XV

N-phenyl-1-bromocyclobutanecarboxamide is prepared by reacting 1-bromocyclobutane-1-carbonyl chloride with aniline following the procedure described in Example XIV. The compound melts at 89–90° C.

EXAMPLE XVI

N-phenyl-1-phenylcyclopropanecarboxamide is prepared by reacting 1-phenylcyclopropane-1-carbonyl chloride with aniline following the procedure described in Example XIV. The compound melts at 123–125° C.

The following example shows the activity of many of the compounds as post-emergent herbicides at a 5 pounds per acre rate of application.

EXAMPLE XVII

A water suspension of the chemical is prepared by combining 0.4 gram of the chemical to be tested with 4 ml. of a solvent mixture (3 parts Emulphor EL-719 combined with one part xylene and one part kerosene) and then adding sufficient warm water to make 40 ml. of mixture. Emulphor EL-719 is described as a polyoxyethylated vegetable oil.

Oats, wheat, peas, radish, flax, millet, alfalfa, tomatoes, and sugar beets are planted in 4″ pots in the greenhouse. Ten to eighteen days after the emergence of the plants, they are sprayed with the above prepared water emulsions at a rate of 5 pounds of the active chemical per acre and a spray volume of 60 gallons per acre. Seven days after application, the plants are observed and the results of the treatment are shown in Table III below.

The plants are rated as follows:

| | |
|---|---|
| C=Chlorosis | 0=No effect |
| N=Necrosis | 1=Slight effect |
| G=Growth inhibition | 2=Moderate effect |
| K=Non-emergence | 3=Severe effect |
| F=Formative effect | 4=Maximum effect or dead plants |

The following example illustrates the activity of many of the compounds of this invention as pre-emergent herbicides at a 10 pounds per acre rate of application.

EXAMPLE XVIII

An acetone solution of the chemical to be tested is prepared by dissolving 290 mg. of the chemical in 200 ml. of acetone.

Disposable paper half-flats are seeded and sprayed with the acetone solutions at a rate to give 5 pounds of the active compound per acre. One flat, which has been seeded with alfalfa, brome, flax, oats, radishes, and sugar beets,

TABLE III

| Compound | Oats | Wheat | Soybeans | Radish | Flax | Millet | Alfalfa | Tomato | Sugar Beets |
|---|---|---|---|---|---|---|---|---|---|
| N-(3,4-dichlorophenyl)-1-methylcyclopropanecarboxamide | N4 | N4 | [1] N4 | | N4 | N4 | N4 | N4 | N4 |
| N-(3-chlorophenyl)-1-methylcyclopropanecarboxamide | N1G1 | N4 | [1] N4 | | N4 | N4 | N4 | N4 | N4 |
| N-phenyl-1-chlorocyclopropanecarboxamide | 0 | G1 | 0 | 0 | N2 | N1 | C1 | 0 | G1 |
| N-(3,4-dichlorophenyl)-1-methylcyclopropanecarboxamide | N3 | N2 | [1] C2 | N4 | N3 | N4 | N4 | 0 | N4 |
| N-phenyl-1-phenylcyclopropanecarboxamide | 0 | 0 | 0 | 0 | 0 | 0 | 0 | 0 | 0 |
| N-(3-chlorophenyl)-1-chlorocyclopropanecarboxamide | G1 | 0 | N1 | N2 | N3 | 0 | N2 | N1 | N1 |
| N-(3-chloro-4-methylphenyl)-1-chlorocyclopropanecarboxamide | 0 | 0 | N1 | N2 | N1 | N3 | N2 | N1 | N3 |
| N-(3-chloro-4-methylphenyl)-1-methylcyclopropanecarboxamide | N2 | G2 | N1 | N3 | N3 | | N4 | N3 | N4 |
| N-(3,4-dichlorophenyl)-1-butylcyclopropanecarboxamide | 0 | 0 | 0 | 0 | N1 | 0 | | N | 0 |
| N-(2,6-dichlorophenyl)-1-methylcyclopropanecarboxamide | 0 | 0 | 0 | 0 | 0 | 0 | 0 | 0 | 0 |
| N-(2,6-dimethylphenyl)-1-methylcyclopropanecarboxamide | 0 | 0 | 0 | 0 | 0 | 0 | 0 | 0 | 0 |
| N-(5-chloro-2-methylphenyl)-1-methylcyclopropanecarboxamide | C1 | C1 | C2 | C3N1 | C1 | G2N2 | N3C2 | N2 | N4 |
| N-(3,4-dichlorophenyl)-1-bromocyclobutanecarboxamide | 0 | 0 | [1] 0 | N2 | N2 | N4 | N2 | 0 | N2 |
| N-phenyl-1-bromocyclobutanecarboxamide | 0 | 0 | [1] 0 | N2 | N1 | N4 | N2 | 0 | N1 |

[1] Peas used in these trials.

is held at 75° F. day temperature; another flat which has been seeded with corn, coxcomb, cotton, crabgrass, millet, and soybeans is held at 85° F. Twenty-one days after seeding and treatment the flats are examined, plant emergence and chemical effects on the seedlings are rated and are as shown in Table IV. The rating system employed is the same as in Example XVII.

drogen atom and $R_3$ is a monocyclic aryl group such as the phenyl group and the nuclearly substituted phenyl groups. In the special case when $R_2$ is a monocyclic aryl group, $R_3$ can be a hydroxy group.

Examples of nitrogen substituents represented by $R_2$ and $R_3$ in the above formula are alkyl groups, and especially the lower alkyl groups having from about 1 to

TABLE IV

| Compound | Alfalfa | Brome | Flax | Oats | Radish | Sugar Beets | Corn | Cox-comb | Cotton | Crab-grass | Millet | Soybeans |
|---|---|---|---|---|---|---|---|---|---|---|---|---|
| N-(3,4-dichlorophenyl)-1-methyl-cyclopropanecarboxamide. | N4 | N4 | N4 | N4 | N4 | N4 | N3 | N4 | N2 | N4 | N4 | N4 |
| N-(3-chlorophenyl)-1-methylcyclo-propanecarboxamide. | N4 | N4 | N3G4 | N4 | N3 | N4 | G2 | N4 | G2 | N2 | N4 | G3K3 |
| N-phenyl-1-chlorocyclopropane-carboxamide. | 0 | 0 | 0 | 0 | 0 | 0 | 0 | 0 | 0 | 0 | 0 | 0 |
| N-(3,4-dichlorophenyl)-1-methyl-cyclopropanecarboxamide. | N4 | N3 | N2 | N2 | N4 | N4 | 0 | N4 | 0 | N4 | N4 | C2K2G3 |
| N-phenyl-1-phenylcyclopropane-carboxamide. | 0 | 0 | 0 | 0 | 0 | 0 | 0 | 0 | 0 | 0 | 0 | 0 |
| N-(3-chlorophenyl)-1-chlorocyclo-propanecarboxamide. | N4 | K4 | G2 | G2 | 0 | 0 | K2G2 | N4 | G2 | N2G2 | N3G2 | K4 |
| N-(3-chloro-4-methylphenyl)-1-chlorocyclopropanecarboxamide. | N3 | 0 | 0 | 0 | 0 | 0 | G1 | N4 | 0 | N2G2 | N3G2 | K4 |
| N-(3-chloro-4-methylphenyl)-1-methylcyclopropanecarboxamide. | N3 | N1 | N2K2 | 0 | 0 | N2 | 0 | N4 | 0 | 0 | 0 | 0 |
| N-(3,4-dichlorophenyl)-1-butyl-cyclopropanecarboxamide. | 0 | 0 | 0 | 0 | 0 | 0 | 0 | 0 | 0 | 0 | 0 | 0 |
| N-(2,6-dichlorophenyl)-1-methyl-cyclopropanecarboxamide. | G2 | N4 | N1 | K3N1 | G2 | N1 | N1 | 0 | 0 | N2 | N3 | N2 |
| N-(2,6-dimethylphenyl)-1-methyl-cyclopropanecarboxamide. | N4 | N1 | N1 | N1 | N1 | N1 | N1 | N2 | 0 | N2 | N3 | N1 |
| N-(5-chloro-2-methylphenyl)-1-methylcyclopropanecarboxamide. | N4 | N4 | N4 | N4 | N4 | N4 | C4 | N4 | 0 | C4 | C4 | C4 |
| N-(3,4-dichlorophenyl)-1-bromo-cyclobutanecarboxamide. | N4 | 0 | N2 | 0 | 0 | 0 | 0 | N4 | 0 | 0 | N4 | G2 |
| N-phenyl-1-bromocyclobutane-carboxamide. | 0 | 0 | 0 | 0 | 0 | K2 | 0 | 0 | 0 | 0 | 0 | 0 |

EXAMPLE XIX

N - (2 - methyl - 5 - chlorophenyl) - 1 - methylcyclopropanecarboxamide is tested as a pre-emergent herbicide by the method described in Example XVIII except that the application rates are 5, 2, and 1 pounds per acre. The results are as shown in Table V:

about 8 carbon atoms, either straight or branched chain; cycloalkyl groups, especially the cyclic lower alkyl groups having about 3 to 8 carbon atoms; alkenyl and alkynyl groups, and especially the lower alkenyl and alkynyl groups having about 2 to about 8 carbon atoms; aralkyl groups and especially the monocyclic aralkyl groups such

TABLE V

| Application Rate | Alfalfa | Brome | Flax | Oats | Radish | Sugar Beets | Corn | Cox-comb | Cotton | Crab-grass | Millet | Soy- |
|---|---|---|---|---|---|---|---|---|---|---|---|---|
| 5 | N4 | N4 | N4 | C3G2 | N4 | N4 | C4 | N4 | 0 | N4 | N4 | C3 |
| 2 | N4 | N4 | C3 | C2 | C4 | N4 | C3 | N4 | 0 | C3 | N4 | C2 |
| 1 | N4 | C3 | C1 | C1 | C4 | N4 | C2 | N3 | 0 | C4 | C4 | C2 |

These data show that N-(2-methyl-5-chlorophenyl)-1-methylcyclopropanecarboxamide is an excellent pre-emergent herbicide for some crops, such as alfalfa, brome, coxcomb, and particularly crabgrass, at application rates as low as 1 pound per acre.

The cycloalkane carboxamides provided by this invention conform to the formula:

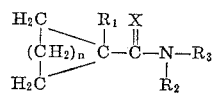

wherein $n$ has a value of 0–1; $R_1$ is selected from the group consisting of alkyl groups which preferably contain 1–8 carbon atoms, aryl groups, preferably monocyclic aryl groups such as phenyl, tolyl, xylyl, etc., and halogen atoms such as fluorine, chlorine, bromine, and iodine; and $R_2$ and $R_3$ are independently selected from the group consisting of hydrogen, alkyl groups, cycloalkyl groups, alkenyl groups, alkynyl groups, aryl groups, aralkyl groups, heterocyclic groups, and, when taken together with the nitrogen atom to which $R_2$ and $R_3$ are attached, a heterocyclic group. In a preferred group of the compounds conforming to the above formula, $R_2$ is a hyas benzyl and nuclearly substituted benzyl groups; aralkyl groups, and especially the monocyclic aryl groups such as the phenyl group and nuclearly substituted phenyl groups having nuclear substituents such as halo, and especally chloro, iodo, fluoro and bromo, alkoxy and especially lower alkoxy groups containing 1–8 carbon atoms, cyano, nitro, alkyl and especially lower alkyl groups containing 1–8 carbon atoms, acyloxy and hydroxy; and heterocyclic groups, especially monocyclic groups having at least one nitrogen, oxygen or sulphur atom (or two or more hetero atoms) in addition to carbon in the ring. $R_2$ and $R_3$ also may be linked together with the amide nitrogen atom to constitute a heterocyclic radical, such as the monocyclic radicals having nitrogen, oxygen, or sulphur in addition to carbon in the ring, for example the amides formed from piperidine, piperazine, morpholine, and the like.

Representative examples of radicals represented by $R_2$ and $R_3$ in the above formula are hydrogen, methyl, ethyl, 2-chloroethyl, 2-hydroxyethyl, propyl, isobutyl, pentyl, isooctyl, allyl, butenyl, pentenyl, butynyl, 4-chloro-2-butynyl, propynyl, phenyl, naphthyl, 3-chlorophenyl, 3-iodophenyl, 3 - fluorophenyl, 4 - bromophenyl, 3,4 - dichlorophenyl, 2,4,5 - trichlorophenyl, 3 - methylphenyl, 3,4 - dibromophenyl, 2,5-difluorophenyl, 4-cyanophenyl, 3,5-dinitrophenyl, 4-hydroxyphenyl, 3-chloro-4 - methylphenyl, 4 - acetoxyphenyl, 3 - methoxyphenyl, 3 - trifluoromethylphenyl, cyclopropyl, cyclohexyl, cyclobutyl, 4-cyclopropylcarbonyloxyphenyl, benzyl, 3,4-dichlorobenzyl, 2-thiazolyl, 2-pyridyl, and triazolyl. Compounds having a cyclic radical in which the amide nitrogen atom is part of the ring are formed from compounds such as piperidine, morpholine and pyrrolidine.

A preferred subgroup of compounds which constitute a preferred embodiment of the invention conform to the formula set forth below:

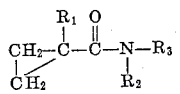

wherein $R_1$, $R_2$, and $R_3$ have the same meaning as previously set forth.

Another more limited group of compounds which constitute an especially preferred embodiment of the invention conform to the formula set forth below:

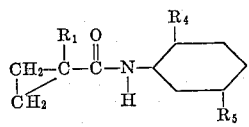

wherein $R_1$ has the same meaning as previously set forth, where $R_4$ is a 1–8 carbon alkyl group and especially a methyl group and $R_5$ is a 1–8 carbon alkyl group or a halogen atom of the group consisting of fluorine, chlorine, bromine and iodine and especially chlorine. The most preferred compounds, particularly from the economic standpoint, are those in which $R_4$ is methyl and $R_5$ is selected from the group consisting of chloro, methyl, and isopropyl.

Yet another group of especially preferred compounds conform to the formula set forth below:

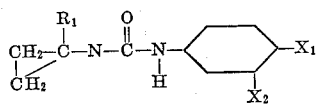

wherein $R_1$ has the meaning previously set forth; and $X_1$ and $X_2$ are independently selected from the group consisting of hydrogen, fluorine, chlorine and a methyl group with the further provision that at least one of said X substituents is a chlorine or fluorine atom.

The cycloalkane carboxamides of this invention can be readily prepared by the reaction of cycloalkane carboxylic acid halides such as the acid chlorides, with an appropriate amine. Preferably, the reaction is run in the presence of an inert organic solvent such as cyclohexane, toluene, dioxane, benzene, n-hexane or n-pentane. Since hydrogen halide is a by-product of the reaction, it is desirable to use a molar excess of the amine or, preferably, a tertiary amine such as triethylamine or pyridine, to react with the hydrogen halide that is evolved, thereby improving the yields and purity of the desired product. This reaction runs smoothly at room temperature or slightly below room temperature and normally is completed in about 0.5 to 2 hours. A preferred reaction temperature is about 15 to 25° C., which temperature is sufficiently low to maintain good control of the reaction. To make full use of the reactants, it is preferred to add the cycloalkane carboxylic acid halide to a solution of the amine (and tertiary amine hydrogen halide acceptors if uesd) in an organic solvent, thus maintaining an excess of amine during the reaction period. When an organic solvent for the cycloalkane carboxamide is used, the by-product pyridine hydrohalide can be removed by filtration and the desired cycloalkane carboxamide can be isolated from the solvent by known procedures. The crude amine can be recrystallized from solvents such as water-alcohol mixtures, n-hexane or ethyl acetate. When the reaction product is a liquid, it can be purified by distillation under reduced pressures.

In an alternative and preferred procedure the cycloalkane carboxamides can be prepared by reacting an ester of an appropriate cycloalkane carboxylic acid with the appropriate amine in the presence of an equimolar quantity of an alkali metal alcoholate. This method is more fully described and claimed in the copending application of Richard De Feo, Ser. No. 265,372, filed March 15, 1963, now abandoned, and assigned to the assignee of the present application. The description of this copending application is incorporated herein by reference.

The cycloalkane carboxamides in which X of the first formula appearing above is sulfur can be prepared from their oxygen analogues by sulfurization with phosphorus pentasulfide at an elevated temperature, e.g., about 90–110° C.

The cycloalkane carboxamides of the invention can be used as herbicides at application rates of from about 20 pounds to as little as about 0.1 pound per acre. When the compounds are used as a pre-emergent herbicide, an application rate of about 0.5 to about 20 pounds per acre is normally used, with about 2 to about 10 pounds per acre being preferred. When they are used as a post-emergent herbicide, an application rate of about 0.01 to 20 pounds of one or more active compound per acre is used, with an application rate of about 0.1 to 3 pounds per acre being preferred. When using a water emulsion of the herbicide, a spray volume of about 1 to about 100 gallons of aqueous emulsion, and preferably about 5 to 40 gallons, per acre is used.

The cycloalkane carboxamides of the present invention show good activity against a number of plant species. They also show better selectivity against a number of closely related species than is usually observed with compounds having such a high degree of activity. The selectivity of kill can be enhanced by proper formulation and control of application rates. The cycloalkane carboxamides have a high degree of resistance to most of the common soil microorganisms and, when used as pre-emergent herbicides, provide a high degree of control over an extended period of time.

Certain species of the 1-substituted cyclopropanecarboxamides, particularly N-(2-methyl-5-chlorophenyl)-1-methylcyclopropanecarboxamide, appear to have substantial utility as pre-emergent herbicides in controlling crabgrass in bluegrass lawns.

The excellent herbicidal activity of the cycloalkanecarboxamides of this invention requires the application of only small amounts of the active ingredient distributed uniformly over a wide area. Of course, this is difficult to do employing the pure material. However, by increasing the bulk of the material, such as by mixing the compound with an inert diluent or carrier, the application to growing plants and soil can be achieved more readily. Such carriers may be either solids, such as talc, clay, diatomaceous earth, sawdust, calcium carbonate or the like, or liquids such as water, kerosene, acetone, benzene, toluene, xylene, and the like, in which the active compound may be dissolved or dispersed.

Emulsifying agents preferably are used to achieve a suitable emulsion or dispersion in liquids such as water to give aqueous sprays. Emulsifying agents and wetting agents may also be used to aid in dispersing the active compound in liquid used as the carrier in which the compound is not completely soluble and to increase coverage by the active compound. Emulsifying agents and wetting agents, also known as "surface active agents," are sold under numerous trade marks and may be either pure compounds, mixtures of compounds of the same general group, or they may be mixtures of compounds of different classes.

There are thus also provided by this invention novel herbicidal compositions containing one or more of the described cycloalkanecarboxamides intimately dispersed with or dissolved in a surface active agent. Typical satisfactory surface active agents which may be used are the alkali metal higher alkylarylsulfonates such as sodium dodecylbenzenesulfonate and the sodium salts of alkylnaphthalenesulfonic acids, fatty alcohol sulfates such as the sodium salts of the monoesters of sulfuric acid with n-aliphatic alcohols containing about eight to eighteen carbon atoms, long chain quarternary ammonium compounds, sodium salts of petroleum derived alkylsulfonic acids, polyethylene sorbitan monooleate, alkylarylpolyether alcohols, water-soluble lignin sulfonate salts, alkalicasein compositions, long chain alcohols usually containing about ten to eighteen carbon atoms, and condensation products of ethylene oxide with fatty acids, alkylphenols or mercaptans.

Other additives such as a lanolin or kerosene emulsion, or Tween-20 (a product described as sorbitan monolaureate polyoxyalkylene derivative), stickers and other auxiliary materials may be included in solid or liquid formulations to increase coverage of the active compound. These materials are also considered to be surface active agents.

The above descriptions and particularly the examples are set forth for purposes of illustration only. Many variations and modifications thereof will be obvious to those skilled in the art and can be made without departing from the spirit and scope of the invention herein described.

What is claimed is:

1. The method of controlling plant growth which comprises applying to the locus of the plant a herbicidal quantity of a cycloalkane carboxamide conforming to the formula:

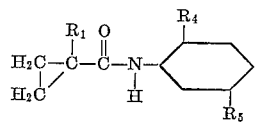

wherein $R_1$ is selected from the group consisting of a methyl group, and halogen atoms; $R_4$ is a 1-8 carbon alkyl group; and $R_5$ is selected from the group consisting of 1-8 carbon alkyl groups and halogen atoms of the group consisting of fluorine, chlorine, bromine, and iodine.

2. The method of controlling plant growth which comprises applying to the locus of the plant a herbicidal quantity of a cycloalkane carboxamide conforming to the formula:

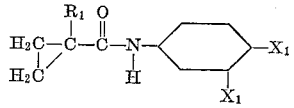

wherein $R_1$ is selected from the group consisting of a methyl group and halogen atoms; and $X_1$ and $X_2$ are independently selected from the group consisting of hydrogen, fluorine, chlorine and a methyl group with the further provision that at least one of said X constituents is selected from the group consisting of chlorine and fluorine.

3. The method of controlling plant growth which comprises applying to the locus of the plant a herbicidal quantity of 3',4'-dichloro-1-methylcyclopropanecarboxanilide.

4. The method of controlling plant growth which comprises applying to the locus of the plant a herbicidal quantity of 3'-chloro-4'-methyl-1-methylcyclopropanecarboxanilide.

5. The method of controlling plant growth which comprises applying to the locus of the plant a herbicidal quantity of 3'-chloro-1-methylcyclopropanecarboxanilide.

6. The method of controlling plant growth which comprises applying to the locus of the plant a herbicidal quantity of 5'-chloro-2'-methyl-1-methylcyclopropanecarboxanilide.

References Cited

UNITED STATES PATENTS 3,201,466   8/1965   Dubravin _____ 71—2.6 X

OTHER REFERENCES 1,005,784 (4-1957) Fischer et al., German Application.

LEWIS GOTTS, Primary Examiner.

JAMES O. THOMAS, JR., Examiner.